US010814892B2

(12) United States Patent
Bartek

(10) Patent No.: US 10,814,892 B2
(45) Date of Patent: Oct. 27, 2020

(54) V-AWARE END OF TRAIN DEVICE

(71) Applicant: HARSCO TECHNOLOGIES LLC, Fairmont, MN (US)

(72) Inventor: Peter Michael Bartek, Ledgewood, NJ (US)

(73) Assignee: HARSCO TECHNOLOGIES LLC, Fairmont, MN (US)

(*) Notice: Subject to any disclaimer, the term of this patent is extended or adjusted under 35 U.S.C. 154(b) by 278 days.

(21) Appl. No.: 15/946,972

(22) Filed: Apr. 6, 2018

(65) Prior Publication Data

US 2018/0222503 A1 Aug. 9, 2018

Related U.S. Application Data

(63) Continuation of application No. 14/873,578, filed on Oct. 2, 2015, now Pat. No. 9,994,242.

(Continued)

(51) Int. Cl.
*B61L 23/34* (2006.01)
*B61L 15/00* (2006.01)
(Continued)

(52) U.S. Cl.
CPC ....... *B61L 15/0054* (2013.01); *B61L 15/0027* (2013.01); *B61L 15/0072* (2013.01); *B61L 23/34* (2013.01); *H04W 4/023* (2013.01); *H04W 4/40* (2018.02); *H04W 4/42* (2018.02); *B61L 2205/04* (2013.01)

(58) Field of Classification Search
CPC .. B61L 23/34; B61L 15/0027; B61L 15/0054; B61L 15/0072; B61L 2205/04; B61L 25/025; B61L 25/021; B61L 23/00; H04W 4/046
See application file for complete search history.

(56) References Cited

U.S. PATENT DOCUMENTS 2,762,913 A * 9/1956 Jepson .................... B61L 23/34
340/903
5,223,844 A * 6/1993 Mansell .................. B60R 25/33
342/357.31
(Continued)

FOREIGN PATENT DOCUMENTS

DE 4436983 A1 4/1996
DE 19509696 A1 9/1996

OTHER PUBLICATIONS

Extended European search report dated Apr. 10, 2018 in connection with European patent application No. 15846563.3.
(Continued)

*Primary Examiner* — Mark T Le
(74) *Attorney, Agent, or Firm* — Norton Rose Fulbright US LLP

(57) ABSTRACT

Inter-vehicle communications for avoiding rear collision of rail vehicles on a railroad that includes, for example, a collision avoidance system. The collision avoidance system may comprise an end-of-train device and a V-aware unit located on different vehicles. The two devices may be configured to wirelessly communicate with each other, and then detect each other's presence by estimating a distance between them. Warnings may be issued to respective operators against a collision hazard when the distance drops to or below a pre-determined threshold.

17 Claims, 3 Drawing Sheets

Related U.S. Application Data

(60) Provisional application No. 62/071,815, filed on Oct. 3, 2014.

(51) Int. Cl.
*H04W 4/02* (2018.01)
*H04W 4/40* (2018.01)
*H04W 4/42* (2018.01)

(56) References Cited

U.S. PATENT DOCUMENTS

| | | | |
|---|---|---|---|
| 5,404,338 | A | 4/1995 | Murai et al. |
| 5,720,455 | A | 2/1998 | Kull et al. |
| 5,757,291 | A | 5/1998 | Kull |
| 7,222,003 | B2* | 5/2007 | Stull .................. B61L 15/0027 701/19 |
| 9,004,412 | B2 | 4/2015 | Brown |
| 2009/0109013 | A1 | 4/2009 | Kane et al. |
| 2010/0253548 | A1 | 10/2010 | Kane et al. |
| 2014/0014784 | A1 | 1/2014 | Brown |
| 2014/0240088 | A1* | 8/2014 | Robinette .......... G06K 19/0705 340/5.61 |

OTHER PUBLICATIONS

International Search Report and Written Opinion dated Jan. 26, 2015 of corresponding PCT application No. PCT/US2015/053702.

\* cited by examiner

V-AWARE END OF TRAIN DEVICE

CROSS-REFERENCE TO RELATED APPLICATIONS

This application is a continuation application of application Ser. No. 14/873,578 filed on Oct. 2, 2015, which claims priority to U.S. Provisional Application No. 62/071,815, filed Oct. 3, 2014 and entitled "V-Aware End of Train Device," the disclosure each of which is hereby incorporated by reference in their entirety.

BACKGROUND

End-of-train devices (ETDs) are widely used, in lieu of cabooses, for signaling and monitoring purposes in trains that travel on railroads. Information monitored by an ETD may include the air pressure of a brake line, battery condition, as well as train movement. This information may be transmitted to a crew in a locomotive by a battery powered telemetry transmitter. However, existing "dumb" ETDs may only provide a visible indication of the rear of a train with a flashing red taillight. Other rail vehicles sometimes approach from the rear of the train and may get dangerously close to the train. Since an operator of the approaching vehicle is prone to not pay attention (or even fall asleep), the approaching vehicle may run into the end of the train. Therefore, it is desirable to design additional warning mechanisms for preventing collision from the rear.

BRIEF SUMMARY

The present disclosure generally relates to avoiding rear collision of rail vehicles on a railroad using inter-vehicle communications. According to some aspects of the present disclosure, a collision avoidance system may comprise an end-of-train device and a Vehicle (V)-aware unit on different rail vehicles. An end-of-train device may be positioned at about a rear end of a train. The end-of-train device may be configured to wirelessly communicate (e.g., using radio frequencies near 400 Megahertz (MHz)) with a rail vehicle that is moving towards the rear end of the train, and then detect, based on the communication, a presence of the rail vehicle in order to prevent a potential collision between the two.

In some embodiments, a V-aware unit may be installed at a position visible to an operator of a rail vehicle. The V-aware unit may communicate with an end-of-train device to determine a rough distance between the two vehicles, and may then issue a visual or audio warning to the operator against collision hazard when the distance drops to or below a pre-determined threshold.

The "smart" end-of-train devices or units described herein may add an extra layer of protection to rail vehicles which are equipped with V-aware units described herein. The detection of presence virtually offers rail vehicle operators the ability to "see" the end of a train in all types of weather and terrain. The V-aware unit and/or the end-of-train device may also have global positioning system (GPS) and cellular capabilities for communications with an operational control center.

BRIEF DESCRIPTION OF THE DRAWINGS

Reference is now made to the following descriptions taken in conjunction with the accompanying drawings.

DETAILED DESCRIPTION

Various embodiments of rear collision avoidance systems and associated procedures and methods of using such systems according to the present disclosure are described. It is to be understood, however, that the following explanation is merely exemplary in describing devices, systems, and methods of the present disclosure. Accordingly, modifications, changes and substitutions are contemplated.

Figure 1:
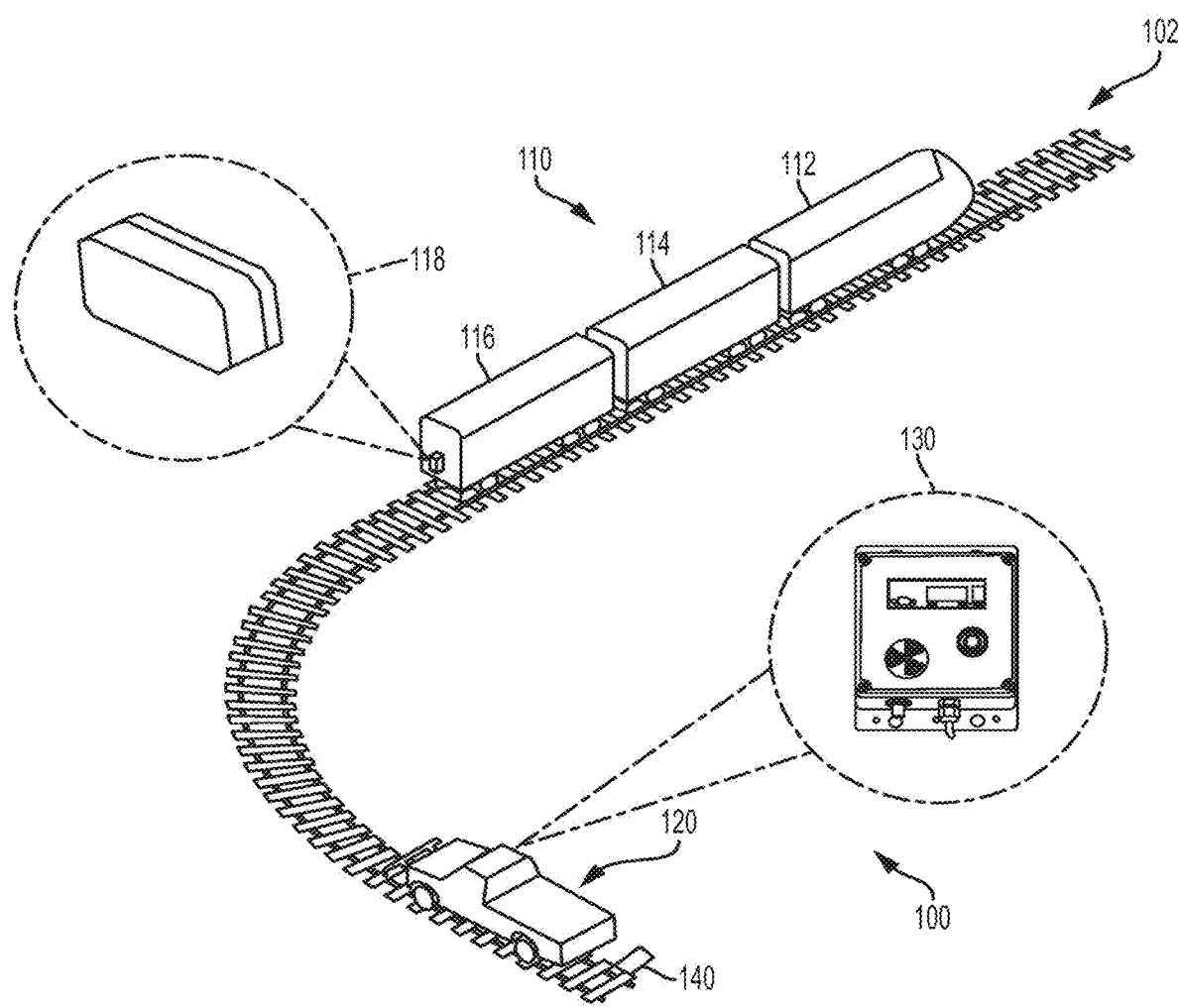
FIG. 1 illustrates a perspective view of an exemplary embodiment of a rear collision avoidance system according to the present disclosure.

FIG. 1 is a schematic diagram illustrating an exemplary embodiment of a rear collision avoidance system 100. Although the present disclosure uses railroad as an example application, the disclosed principles may be similarly applied to any other appropriate industrial setting. As shown in FIG. 1, various rail vehicles, such as a train 110 and a maintenance vehicle 120 may be travelling on a railroad 102. The maintenance vehicle 120 may be travelling behind and approaching the train 110, which may be still or moving. Note that rail vehicles may include other types of vehicles such as those capable of travelling on both rail and non-rail roads.

The train 110 may comprise a locomotive 112 and a number of cars coupled thereto. For example, a first car 114 may be attached to the locomotive 112, and a second (and last) car 116 may be attached to the first car 114. An end-of-train device 118 may be attached to the rear end of the car 116. Every two cars may have a coupling link (e.g., with signal cables) in between to work as a communications link. The end-of-train device 118 may communicate with a head-end device in the locomotive 112 through all the cars. The end-of-train device 118 may, alternatively or additionally, communicate with the locomotive 112 via radio communications. For example, if one or more cars (e.g., the car 116) gets decoupled from the preceding cars, the end-of-train device 118 may quickly detect this issue (e.g., within 30 seconds), and may inform the locomotive 112 via radio communications. Thus, the end-of-train device 118 may be a "smart" unit that sends back data to a crew in the locomotive via radio-based telemetry.

The end-of-train device 118 may have any suitable shape and/or dimension (e.g., 6 inches by 6 inches by 24 inches). The end-of-train device 118 may have an electronic unit comprising one or more processors, memories, transceivers, etc., that enable functions described herein. The structure of the end-of-train device 118 may be flexibly configured depending on the application. For example, the end-of-train device 118 may be implemented as an end-of-train unit that is coupled to another existing end-of-train device (e.g., by inserting Company A's end-of-train unit into the data port of Company B's end-of-train unit device). Alternatively, functional modules described herein may be integrated in one end-of-train device without additional add-ons.

The rail vehicle 120 may be equipped with a purpose-built Vehicle (V)-aware unit 130. The V-aware unit 130 and the end-of-train device 118 together may make up the rear collision avoidance system 100. The end-of-train device 118 is also V-aware in the sense that it communicates with the V-aware unit 130 to detect its presence.

Figure 2:
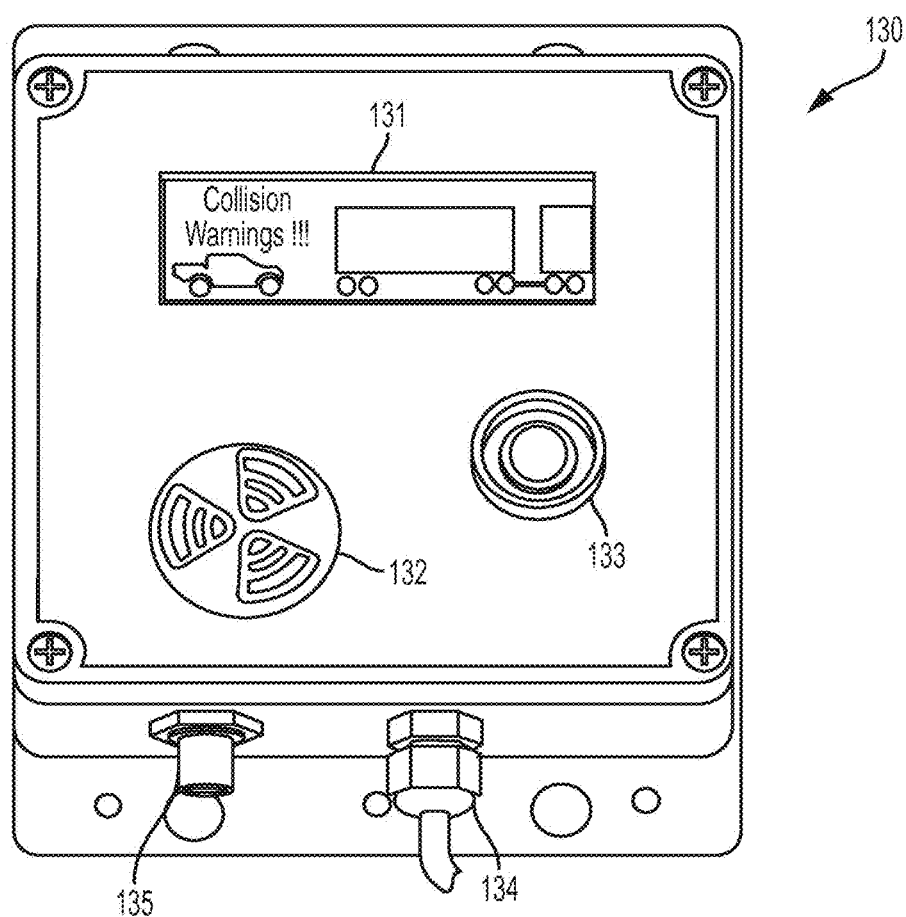
FIG. 2 illustrates a close-up perspective view of a V-aware unit shown in FIG. 1.

FIG. 2 provides a close-up view of an exemplary embodiment of the V-aware unit 130. The V-aware unit 130, sometimes referred to as a collision avoidance unit, device, or system, may be a device that communicates with an end-of-train device to avoid any potential collision thereof (e.g., by calculating or estimating a distance between the V-aware unit 130 and the end-of-train device 118). The V-aware unit 130 may comprise, on the outside, a display 131, an audible alarm 132, a program setting button 133, a power connection 134, and an antenna connection 135. It should be understood that the V-aware unit 130 may further comprise internal components, such as processors, memories, transceivers, etc., that work with the external components.

As shown in FIG. 2, the V-aware unit 130 may communicate with the end-of-train device 118 to detect a presence of the train 110. Suppose an operator is driving the vehicle 120 closer and closing towards the train 110. In some embodiments, when the V-aware unit 130 gets into a radio coverage range (e.g., 1200 feet) from the end-of-train device 118, the V-aware unit 130 may start communicating, intermittently or continuously, with at least one transceiver in the end-of-train device 118 over a radio link for determining at least a distance range between the two. The range (e.g., 40-50 feet, or 300-350 feet) may depend on communication technology used. For example, wireless communications may use radio frequencies near about 400 MHz. Warning may start when the estimated vehicle distance is about 40-50 feet. For higher distance accuracy, communications may comprise sending and receiving chirp signals in a radio frequency band near about 2.4 Gigahertz (GHz).

The display 131 may start showing a warning message to an operator of the rail vehicle 120 at a pre-set distance. The warning message may take any form (e.g., text of "Collision Warning!!!" accompanied by vehicle diagrams). As a result, the operator of the rail vehicle 120 may "see" the end of the train 110 in all types of weather and terrain, even when when the train 110 is actually beyond a line of sight. Transceivers (e.g., GPS, cellular, or radio) on the V-aware unit 130 may be designed to have strong output power in order to operate in harsh outdoor environment. Note that many of the functions of the V-aware 130 described herein may be similarly implemented or adapted on the end-of-train device 118. For example, the end-of-train device 118 may send data regarding the approaching rail vehicle 120 to an engineer (or operator) sitting in the locomotive 112.

A volume of the audible alarm 132 may be configured higher or lower by turning the audible alarm 132. For instance, the audible alarm 132 may be a standard off-the-shelf piezo audible alarm with a baffle, which may be turned to increase or decrease volume. Audible alarming may also be turned on and off. The button 133 may be used to set, change, or program various settings of the V-aware unit 130. The power connection 134 may be wired to vehicle power, e.g., between 18 and 75 direct current (DC) volts, that is provided when the vehicle engine is started or the vehicle electronics are started. The V-aware unit 130 may have any suitable number of transceivers coupled to any suitable number of antennas. For example, the antenna connection 135 may be connected to a coaxial cable, which in turn is connected to an antenna on the rail vehicle 120.

According to some aspects disclosed herein, the V-aware unit 130 may be used to mitigate accidents by informing the rail vehicle operator of potential dangers. The V-aware unit 130 may be installed where the display 131 is in clear view of the operator, or at any other appropriate position. The display 131 of the V-aware unit 130 may show, in real time, a distance (or estimated distance range) between the rail vehicle 120 and the train 110. An estimated or calculated distance may be updated, intermittently or in real time, as the rail vehicle 120 becomes closer to, or further away from, the train 110.

Since the end-of-train device 118 may be installed at the rear end of the train 110, and the V-aware unit 130 may be installed at a fixed location on the rail vehicle 120, determining distances between these objects may have equivalent forms. For example, if a distance between the V-aware unit 130 and the end-of-train device 118 is known, one may easily determine a distance between the head of rail vehicle 120 and the back of the train 110. A calculated distance may be adjusted depending on where the V-aware unit 130 is located on the rail vehicle 120, depending on a length of the vehicle 120, or depending on whether the rail vehicle 120 has equipment mounted or coupled to its front or rear that extends the length of the vehicle 120.

The V-aware unit 130 may issue visual alerts and/or audible alerts to the host operator when the vehicle 120 is approaching the train 110. Distances at which alarms are issued may be flexibly configured, such as 1000, 800, 600, 300, 200, 100, 75, 50, and 25 feet. The alarming distance may depend on a speed of the vehicle 120, which may be determined using a GPS module. For example, at higher speeds, the vehicle 120 may require a longer alarming distance to give sufficient time for the operator to act (e.g., apply manual brake to stop the rail vehicle 120).

When a distance between the V-aware unit 130 and the end-of-train device 118 drops to or below a certain pre-determined threshold (e.g., 300 feet at high speeds, or 24 feet at low speeds), alarms may be triggered. The audible alarm 132 may sound continuously, informing the vehicle operator of a collision hazard. There may also be pre-determined audio patterns that intensify as the distance decreases. For instance, three beeps may sound when the train 110 is closer than 75 feet, six beeps may sound when the train 110 is closer than 50 feet, and beeping may be continuous when the train 110 is closer than 25 feet.

The V-aware unit 130 and/or the end-of-train device 118 may record and keep data logs. In an embodiment, when a distance between them drops to or below a threshold, a violation of a safety rule may be identified by the V-aware unit 130, or the end-of-train device 118, or both. A memory may store a data log of violations of safety rules. The date and time of each event may be saved in an onboard memory. Additional events may be logged when the operator presses a button or makes changes to configuration settings. Further, data logging may be continuous or triggered by violation events. Exemplary events that trigger data logging may include distance threshold (proximity of 1000 feet, 600 feet, 300 feet, 75 feet, 50 feet, and 25 feet), configuration changes, and button presses by the operator. A unit may log the timestamp at which any of these events had occurred, along with information about the event itself.

The V-aware unit 130 and/or the end-of-train device 118 may be configured to have GPS and cellular modules to communicate with an Operations Control Center ("OCC"). In some embodiments, data that records violations may be reported to an OCC. Data may be transmitted wirelessly over GPS or cellular communications links. In dark territories where there are no GPS or cellular links, data may be transmitted to an OCC via radio communication links (e.g., at about 400 MHz). The V-aware unit 130 and/or the end-of-train device 118 may, alternatively or additionally, have transceivers that work near (at and close to) various frequencies such as 430 MHz, 220 MHz, 900 MHz, 2.4 GHz, GPS frequencies, and cellular frequencies.

Referring back to FIG. 1, when used with a wayside device 140, the end-of-train device 118 may send data to an operator in the locomotive 112 when key locations are passed. In some embodiments, the wayside device 140 may be mounted as along a first rail, a second rail, or both. In some embodiments, for example, the wayside device 140 may be a smart tag that is permanently or removably coupled to the web of a running rail. The wayside device 140 may also be mounted at a distance away from the running rails.

In practice, sometimes the train 110 (e.g., carrying many freight cars) may be several miles long. In this case, the operator in the locomotive 112 may not be able to determine exactly when the end-of-train device 118 has passed a certain point (in a station or a switching yard). For example, when a long train is being backed up in a switching yard, the operator may not know exactly when to stop. By placing the wayside device in the yard, the operator may prevent the end of the train 110 from hitting a yard barrier.

To work with embodiments of collision avoidance systems disclosed herein, rail personnel including a train crew, a vehicle operator, and supervisors at an operations control center ("OCC") may adapt procedural changes. Note that the procedures and processes are given for example only, thus they may be modified (e.g., some steps omitted and some added) within the principles described herein.

According to some aspects of the present disclosure, responsibilities of a train crew (e.g., in the locomotive 112) may include confirming that an appropriate end-of-train device with capabilities described herein is installed and operational.

According to some aspects of the present disclosure, responsibilities of a vehicle operator (e.g., for the rail vehicle 120) may include the following:
1. Ensure that the vehicle is equipped with a V-aware unit and that the unit is operating as designed.
2. When operating an over the road hi-rail vehicle, ensure that a V-aware unit is turned off when the vehicle is off tracks (e.g., during transit to a mounting area).
3. When operating a hi-rail dedicated vehicle:
    a. Keep a V-aware unit turned on.
    b. Before entering a mainline, call Control Tower for clearance and follow all proper rail movement rules and regulations.
    c. Maintain proper distance while traveling to work area.

According to some aspects of the present disclosure, OCC employee responsibilities may include the following:
1. Establish and maintain adequate means of communication with a rail vehicle (e.g., maintenance vehicle) during vehicle movement.
2. Prior to maintenance vehicles entering a track, ensure that all vehicles are equipped with V-aware units and that the units are operational.

Embodiments herein may provide a safe procedure for operating rail vehicles installed with an end-of-train device and a V-aware unit on mainline tracks. According to some aspects of the present disclosure, shift supervisor responsibilities may include the following:
1. Authorize and assemble work maintenance crew to perform track work.
2. Select a qualified person of the work crew to be designated to coordinate the crew activities with a Control Tower and to provide on-track safety for all members of the work crew. The designated qualified person may request and initiate a track work block and may comply with the authorities safety procedures, policies, and standards in order to ensure optimum safety to all personnel.

According to some aspects of the present disclosure, vehicle operator(s) responsibilities may include the following:
1. Confirm that appropriate personnel are on site.
2. Confirm type of maintenance or repair with the shift supervisor and work crew.
3. Provide and supervise on-track safety guidelines for all crew members in and around the work block.
4. Possess, establish, and maintain adequate means of communications with a Control Tower and the work crew throughout the maintenance operation.
5. Ensure proper clearance is obtained by a Control Tower before entering mainline tracks.
6. Ensure that a V-aware unit is installed and operational.

According to some aspects of the present disclosure, vehicle operator(s) may verify that an end-of-train device is equipped with an end-of-train unit (e.g., attached or integrated) prior to leaving a yard or siding. If the end-of-train device is equipped with the end-of-train unit, ensure that it is operational and functioning as designed.

According to some aspects of the present disclosure, employees at a control tower may establish and maintain adequate means of communications with maintenance vehicle(s) and operator(s) throughout a maintenance operation. A control tower may ensure proper clearance is given to a maintenance vehicle before entering the mainline track. A control tower may coordinate all activities with the maintenance vehicle via a vehicle operator.

Figure 3:
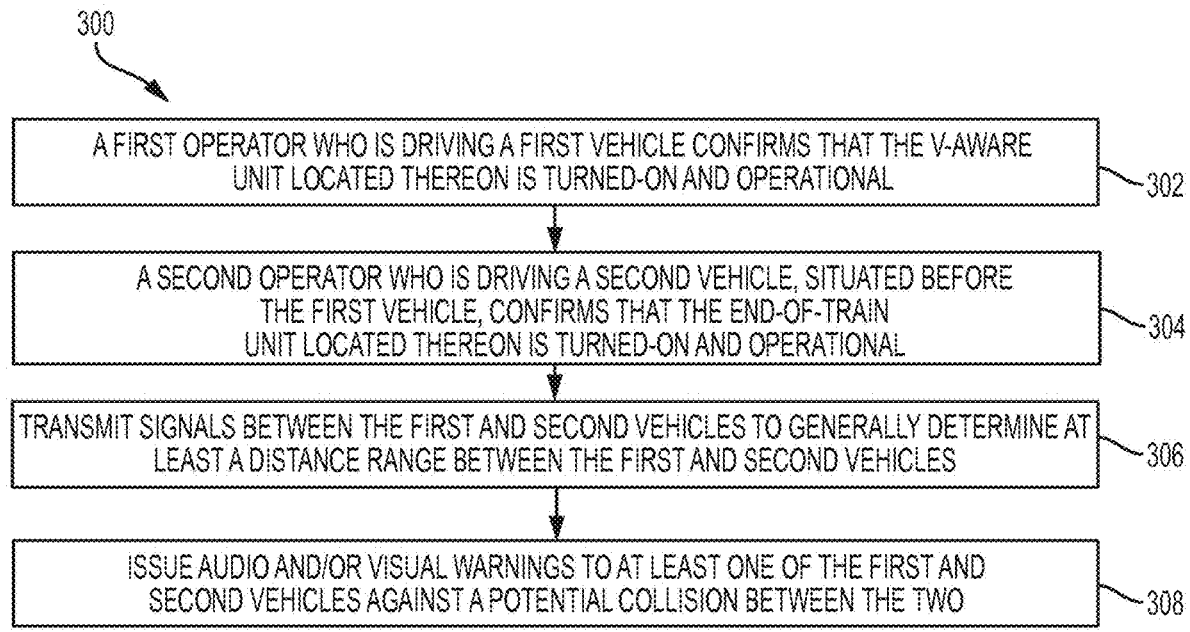
FIG. 3 is a flowchart illustrating an exemplary process of rail communication for railroad collision avoidance according to the present disclosure.

FIG. 3 is a flowchart illustrating a process 300 of rail communication for railroad collision avoidance. The process 300 may be implemented in a collision avoidance system (e.g., the system 100), in which a first vehicle (e.g., the rail vehicle 120) is equipped with a V-aware unit (e.g., the V-aware unit 130), and a second vehicle (e.g., the train 110) is equipped with an end-of-train unit (the end-of-train device 118). The two vehicles may be operated by different operators and located at a distance on the railroad (with second vehicle in front). The V-aware unit may be located at a position visible to a first operator, and the end-of-train unit may be located at about a rear end of the second vehicle. Note that the process 300 may be performed by various devices and personnel, and may not exhaustively list all steps necessary to use the system 100.

To start off at action 302, a first operator who is driving the first vehicle may confirm that the V-aware unit located thereon is turned-on and operational. At action 304, a second operator who is driving the second vehicle may confirm that the end-of-train unit located thereon is turned-on and operational. At action 306, signals may be transmitted between the first and second vehicles to generally determine (e.g., calculate or estimate) at least a distance range between the first and second vehicles. Signal transmission may more specifically occur between the V-aware unit and the end-of-train unit. In some embodiments, transmitting signals between the V-aware unit and the end-of-train unit uses at least radio frequencies near 400 MHz or 2.4 GHz. At action 308, audio and/or visual warnings may be issued to at least one of the first and second vehicles against a potential collision between the two. In an embodiment, a warning may be issued to the first operator as a displayed message on the V-aware unit. The operator may take appropriate actions such as stopping the first vehicle. The end-of-train unit may similarly send a warning to an operator of the second device for actions.

Figure 4:
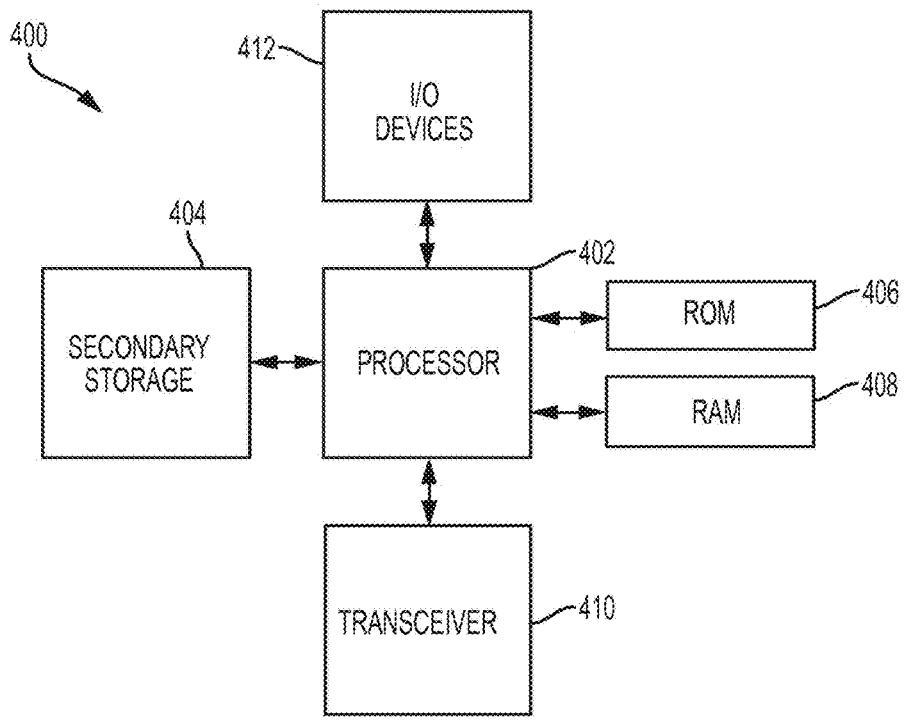
FIG. 4 is a schematic diagram illustrating a general-purpose computing device that may represent various units and devices disclosed herein.

Methods and processes described herein may be implemented on any general-purpose computing device or system, such as a computer or a microcontroller with sufficient processing power, memory resources, and communication capabilities to handle the necessary workload placed upon it. FIG. 4 is a schematic diagram illustrating a general-purpose computing device 400 that may represent various units or systems disclosed herein. For example, the computing device 400 may be used as whole or part of the V-aware unit 130 and the end-of-train device 118. The computing device 400 may implement one or more embodiments of the methods and processes disclosed herein, such as the process 300.

The computing device 400 may comprise a processor 402 (which may be referred to as a central processor unit or CPU), one or more memory devices (e.g., including secondary storage 404, read only memory (ROM) 406, and random access memory (RAM) 408), one or more transceivers 410. Although illustrated as a single processor, the processor 402 is not so limited and may comprise multiple processors. The processor 402 may be a unit capable of data processing, such as one or more CPU chips, cores (e.g., a multi-core processor), field-programmable gate arrays (FPGAs), application specific integrated circuits (ASICs), digital signal processors (DSPs), or combinations thereof. The processor 402 may be implemented using hardware (e.g., circuitry) alone or a combination of software and hardware.

The secondary storage 404 may be used for non-volatile storage of data and as an over-flow data storage device if the RAM 408 is not large enough to hold all working data. The secondary storage 404 may be used to store programs that are loaded into the RAM 408 when such programs are selected for execution. The ROM 406 may be used to store instructions and perhaps data that are read during program execution. The ROM 406 is a non-volatile memory device that typically has a small memory capacity relative to the larger memory capacity of the secondary storage 404. The RAM 408 is used to store volatile data and perhaps to store instructions. Access to both the ROM 406 and the RAM 408 is typically faster than to the secondary storage 404.

A transceiver 410 may serve as an output and/or input device of the computing device 400. For example, if the transceiver 410 is acting as a transmitter, it may transmit data out of the computing device 400. If the transceiver 410 is acting as a receiver, it may receive data into the computing device 400. The transceiver 410 may work with cables or act as wireless antennas. The transceiver 410 may take the form of modems, Ethernet cards, universal serial bus (USB) interface cards, serial interfaces, wireless transceiver cards such as code division multiple access (CDMA), global system for mobile communications (GSM), long-term evolution (LTE), worldwide interoperability for microwave access (WiMAX), GPS, and/or other air interface protocol radio transceiver cards, and other well-known devices capable of wireless communications. The transceiver 410 may enable the processor 402 to communicate with other devices via radio, GPS, or cellular interfaces. Input/output (I/O) devices 412 may include output devices such as a screen display or speaker and input devices such as buttons and dial pads.

It is understood that by programming and/or loading executable instructions onto the computing device 400, at least one of the processor 402, the RAM 408, and the ROM 406 are changed, transforming the computing device 400 in part into a particular machine or apparatus (e.g., a V-aware unit or an end-of-train device having the novel functionality taught herein). It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

While various embodiments of rear collision avoidance systems and related methods of using such systems have been described above, it should be understood that they have been presented by way of example only, and not limitation. Thus, the breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the description of a technology in the "Background" is not to be construed as an admission that technology is prior art to any invention(s) in this disclosure. Neither is the "Brief Summary" to be considered as a characterization of the invention(s) set forth in the claims found herein. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An end-of-train device configured to be coupled to a train, the end-of-train device comprising:
   at least one transceiver configured to wirelessly communicate via a radio link with a vehicle (V)-aware unit coupled to a rail vehicle that is moving towards a rear end of the train; and
   a processor configured to:
      determine, based on communication with the rail vehicle, a distance between the rail vehicle and a portion of the train; and
      transmit, based on the distance between the train and the rail vehicle being less than or equal to a threshold distance, a warning signal to the V-aware unit.

2. The end-of-train device of claim 1, wherein:
   the train comprises a locomotive and at least one car coupled to the locomotive,
   the end-of-train device is configured to be installed on a car of the train that is farthest from the locomotive, and
   the end-of-train device is further configured to transmit the warning signal to the locomotive.

3. The end-of-train device of claim 1, wherein the radio link corresponds to radio frequencies near about 400 MHz or 900 MHz.

4. The end-of-train device of claim 1, wherein the communication with the V-aware unit comprises sending chirp signals in a radio frequency band near about 2.4 GHz.

5. The end-of-train device of claim 1, wherein the processor is configured to transmit, based on the distance between the train and the rail vehicle being greater than the threshold distance, a second signal to the V-aware unit.

6. The end-of-train device of claim 1, further comprising a cellular module configured to communicate with an operations control center over a cellular communications link.

7. The end-of-train device of claim 1, wherein the processor is configured to:
   compare the distance to a plurality of distance ranges within the threshold distance including a first distance range and a second distance range, the second distance range is smaller than the first distance range; and
   based on the distance being within the first distance range, transmit a first signal; and
   based on the distance being within the second distance range, transmit a second signal.

8. A vehicle (V)-aware unit configured to be coupled to a first rail vehicle, the V-aware unit comprising:
   one or more transceivers configured to be coupled to a first rail vehicle and communicate over a radio link with an end-of-train device coupled to a second rail vehicle;
   a processor coupled to the one or more transceivers and configured to:
      detect, based on a communication from the end-of-train device, a presence of the second rail vehicle;
      determine a real time distance between the first rail vehicle and the second rail vehicle; and
      receive, based on the real time distance between the train and the rail vehicle being less than or equal to a threshold, a warning signal from the end-of-train device; and
   a display configured to display the real time distance between the V-aware unit and the end-of-train device.

9. The V-aware unit of claim 8, wherein the processor is further configured to:
   actuate, based on receiving the warning signal, at least one of a visual warning and an audio warning.

10. The V-aware unit of claim 9, wherein the processor is configured to:
    compare the real time distance to a plurality of distance ranges including a first distance range and a second distance range; and
    based on the real time distance being within the first distance range, actuate a first warning; and
    based on the real time distance being within the second distance range, actuate a second warning that is different from the first warning.

11. The V-aware unit of claim 10, wherein the first distance range is greater than the second distance range.

12. The V-aware unit of claim 8, wherein the communication between the V-aware unit and the end-of-train device over the radio link uses at least one of radio frequencies near about 400 MHz and about 2.4 GHz.

13. The V-aware unit of claim 8, wherein the one or more transceivers are further configured to transmit a violation signal to a control center, via a cellular communications link, based on the real time distance between the first rail vehicle and second rail vehicles being less than or equal to the threshold.

14. A method for providing a collision warning associated with a first vehicle and a second vehicle, the method comprising:
    transmitting, via an end-of-train device coupled to a first vehicle, a first signal to a vehicle (V)-aware unit coupled to a second vehicle;
    determining a distance between the first vehicle and the second vehicle; and
    transmitting, via the end-of-train device, a warning signal to the second vehicle based on the distance between the first vehicle and the second vehicle being less than or equal to a threshold.

15. The method of claim 14, further comprising displaying a real time distance measurement associated with the first vehicle, the second vehicle, or both, to an operator of the first vehicle.

16. The method of claim 14, further comprising:
    comparing the distance to a plurality of distance ranges including a first distance range and a second distance range; and
    based on the distance being within the first distance range, transmitting a first signal via the end-of-train device; and
    based on the distance being within the second distance range, transmitting a second signal via the end-of-train device.

17. The method of claim 14, wherein:
    the end-of-train device is coupled to a rear end of the second vehicle,
    transmitting signals between the V-aware unit and the end-of-train device uses at least radio frequencies near 400 MHz, and
    the warning signal is presented as a displayed message on the V-aware unit.

* * * * *

UNITED STATES PATENT AND TRADEMARK OFFICE
CERTIFICATE OF CORRECTION

PATENT NO. : 10,814,892 B2  
APPLICATION NO. : 15/946972  
DATED : October 27, 2020  
INVENTOR(S) : Peter Michael Bartek Page 1 of 1

It is certified that error appears in the above-identified patent and that said Letters Patent is hereby corrected as shown below:

On the Title Page

(56) References Cited: U.S. Patent Documents:  
Add -- 6,404,338 B1 06/2002 Koslar --.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*